(12) United States Patent
Imamura et al.

(10) Patent No.: US 6,235,337 B1
(45) Date of Patent: May 22, 2001

(54) SOYBEAN MILK, SOYBEAN MILK PACK AND PROCESS FOR PRODUCING THE SAME AND PROCESS FOR MANUFACTURING TOFU BY USING THE SAME

(75) Inventors: Katsuhiko Imamura; Yukio Nagata; Kazuhiko Imamura, all of Fukuoka (JP)

(73) Assignees: Yuugengaisya Yahimeshouji; Yuugengaisya Sanshou; Yuugengaisya Tanaka Chinmi, all of Fukuoka (JP)

( * ) Notice: Subject to any disclaimer, the term of this patent is extended or adjusted under 35 U.S.C. 154(b) by 0 days.

(21) Appl. No.: 09/367,813
(22) PCT Filed: Dec. 22, 1998
(86) PCT No.: PCT/IB98/02102
§ 371 Date: Oct. 5, 1999
§ 102(e) Date: Oct. 5, 1999
(87) PCT Pub. No.: WO99/31997
PCT Pub. Date: Jul. 1, 1999

(30) Foreign Application Priority Data

Dec. 22, 1997 (JP) .................................... 9/365606

(51) Int. Cl.$^7$ ...................................... A23L 1/20
(52) U.S. Cl. ........................ 426/634; 426/392; 426/393
(58) Field of Search ................................ 426/634, 392, 426/393

(56) References Cited

U.S. PATENT DOCUMENTS 5,807,602 * 9/1998 Beutler et al. ...................... 426/598

FOREIGN PATENT DOCUMENTS

| 53-66465 | 6/1978 | (JP) . |
| 55-153573 | 11/1980 | (JP) . |
| 62-262960 | 11/1987 | (JP) . |
| 3-259071 | 11/1991 | (JP) . |
| 6-261706 | 9/1994 | (JP) . |

* cited by examiner

Primary Examiner—Anthony J. Weier
(74) Attorney, Agent, or Firm—Young & Thompson

(57) ABSTRACT

A process for producing a soybean milk and soybean milk pack includes cooking ground soybeans with the use of superheated steam containing no or little oxygen, thus extracting soybean proteins to give a cooked bean juice of the soybeans; separating a solid soybean curd lees in the oxygen-free state without cooling the bean juice to give a soybean milk containing no or little dissolved oxygen and having soybean proteins suspended therein. The process also includes filling the thus produced soybean milk into pack containers in an oxygen-free environment with no or little dissolved oxygen without heating or cooling the soybean milk, sealing the containers, and then storing at 1 to 10° C. A process for manufacturing a soybean curd includes introducing the above soybean milk or the contents of the soybean milk packs into an insulating container for manufacturing soybean curd, adding an appropriate amount of coagulant thereto followed by mixing, immersing non-corrosive electrodes in the insulating container, passing an alternating current between these electrodes under such conditions that no electrolysis occurs, and heating the mixture to give a soybean curd.

12 Claims, 8 Drawing Sheets

SOYBEAN MILK, SOYBEAN MILK PACK AND PROCESS FOR PRODUCING THE SAME AND PROCESS FOR MANUFACTURING TOFU BY USING THE SAME

TECHNICAL FIELD

The present invention relates to soybean milk and soybean milk pack which can be stored for a long time without the deterioration of freshness of the soybean milk, and relates to methods for manufacturing the soybean milk and the soybean milk packs, and relates to a method of manufacturing a delicious and mild soybean curd (a tofu in Japanese) which can be easily and stably manufactured anywhere even by nonprofessionals without failure, using the thus manufactured soybean milk and the soybean milk packs and can be eaten in a fresh and hot state just after it is manufactured.

BACKGROUND ART

A soybean curd, being nutritious and manufactured by coagulating soybean protein is a food which has been eaten by many people. Thus, the soybean curd is manufactured by speciality manufacturers in large amounts and sold in supermarkets and the like in large quantities at less expensive price. However, the packed soybean curd sold in large quantities is eaten after a time passes from the time it was manufactured, the taste, deliciousness, smell, and feeling in the mouth, such as on the teeth or tongue thereof are inferior to those of a fresh soybean curd manufactured by soybean curd stores in town. Consequently, since a small, traditional soybean curd stores in town supply a fresh and tasteful soybean curd to dining tables of homes, there exists a soybean curd which is manufactured by hand using a conventional method, although the quantity thereof is small.

Incidentally, a soybean curd is manufactured by grinding soybeans immersed in water; boiling the thus obtained ground soybeans; obtaining a "go" (bean juice which is obtained by grinding soybeans immersed in water or thereafter by boiling ground soybeans) by extracting soybean protein from the boiled soybeans; obtaining soybean milk by separating an okara (solid soybean curd lees) as a solid matter from the bean juice (or nigo which is boiled bean juice); cooling the thus obtained soybean milk; mixing the cooled soybean milk with a coagulant such as a "nigari" (magnesium chloride which is usually used as an aqueous solution) to thereby obtain a mixture of the soybean milk and the nigari; and coagulating the soybean protein by heating the mixture. Calcium sulfate and the like are used as the coagulant of the soybean milk, in addition to the nigari.

As described above, the soybean curd is a very popular food. However, to make a soybean curd having a good taste and a good smell, not only high speciality is required in a technique for manufacturing soybean milk of high quality as a raw material of the soybean curd and in a technique for adding a nigari to the soybean milk and coagulating the soybean milk but also the entire soybean curd manufacturing steps from a step of boiling ground soybeans to a step of coagulating the soybean milk must be successively carried out. As a result, a small soybean curd store is compelled to work from an early morning without a rest to supply a fresh and tasteful soybean curd so that it is in time for family breakfast.

To produce the soybean milk as the raw material of the soybean curd, ground soybeans are conventionally boiled in a dedicated bean-juice-manufacturing caldron. The bean-juice-manufacturing caldron used to the manufacture of soybean milk, a soybean curd and membrane-like soybean curds ("yuba") comprises a cylindrical caldron main body having closed upper and lower ends, a charge port disposed at lower portion of the caldron main body for charging a raw material of bean juice such as ground soybeans to which water is added or the heated ones thereof, a discharge port disposed at upper portion of the caldron main body for discharging the raw material after it is processed in the caldron, and a steam injection pipe having a plurality of injection ports simply formed therethrough and installed in interior of the caldron main body.

Steam used in the conventional bean-juice-manufacturing caldron is air-containing steam obtained by simply heating ordinary water. The ordinary water contains oxygen in an amount of 8–10 ppm.

In the conventional bean-juice-manufacturing caldron, the steam injected from the injection ports of the steam injection pipe is injected in a radial direction. The steam injected in the radial direction collides against the inner peripheral wall of the caldron main body and lose their motion energy so that the flow rate of the streams is reduced. Therefore, the steam having the reduced flow rate cannot sufficiently turn and flow into the space located backward of the injection ports in the caldron main body and the steam only moves upward in the caldron main body. As a result, the steam is in good contact with the raw material of bean juice or the heated one thereof (hereinafter, they are referred to as raw material of bean juice as a whole) which is located in the vicinity of the radially injecting passages of the steam which is directed radially from the injection ports so that the raw material of bean juice located at the position is sufficiently heated with the heat of the steam. However, since the steam comes into contact with the raw material of bean juice in a small quantity which is located in the space backward of the injection ports of the caldron main body, the heat of the steam is not sufficiently transmitted to the raw material of bean juice located at the backward position. Thus, the raw material of bean juice cannot be heated with a necessary quantity of heat. As a result, a part of the raw material of bean juice is sufficiently heated and the other part thereof is insufficiently heated, whereby the raw material of bean juice is unevenly boiled. There is caused thereby a problem that soybean milk of good quality cannot be obtained from the unevenly boiled bean juice.

In the conventional bean-juice-manufacturing caldron, since steam cannot be uniformly and sufficiently supplied to the raw material of bean juice, the steam cannot sufficiently transmit their heat to the raw material of bean juice. Accordingly, a large quantity of the steam stay in the upper portion of the caldron main body while holding a sufficient quantity of heat at high temperature and increase the pressure of the upper portion of the caldron main body as a residual steam. Thus, there arises a problem that the raw material of bean juice is pushed out into the discharge port of the caldron main body in a quantity larger than necessary, the feed of the raw material of bean juice in the caldron main body cannot be properly controlled, the raw material of bean juice has a portion to which the heat of the stream is transmitted well and which is sufficiently heated and a portion which is insufficiently heated, whereby the raw material of bean juice is unevenly boiled, bean juice of good quality cannot be produced and thus a soybean curd of good quality cannot be manufactured.

Incidentally, when a soybean curd is manufactured by coagulating soybean milk by adding a nigari (magnesium chloride) as a coagulant thereto, the nigari can well extract sweetness and flavor of soybeans. However, since the coagulating reaction proceeds too promptly, this process cannot be often performed successfully. Thus, not only a sophisticated technique is required to mix the nigari with the soybean milk but also a speed at which the nigari performs a coagulating reaction must be controlled by minutely monitoring a coagulation state thereof and controlling the temperature thereof. Therefore, conventionally, soybean milk is cooled so as to be slowly coagulated, and after a nigari is well mixed with the soybean milk, the thus obtained mixed solution is slowly heated with steam or in a water bath. Thus, there is a problem that 1–2 hours are necessary to the heating of the mixed solution, which is very inefficient. Further, since a long time is necessary to the heating of the mixed solution, the outside portion of a soybean curd is exposed to a very high temperature as compared with the inside portion thereof and heat is excessively applied to the outside portion of the soybean curd, from which a problem arises in that the outside portion of the soybean curd is heated secondarily and tertiarily and the water keeping property of the thus obtained soybean curd becomes poor.

As described above, when soybean milk, which is obtained by separating an okara from an insufficiently heated bean juice (of low quality), is used in the mixture of the soybean milk with a coagulant such as a nigari and the like which requires the sophisticated technique, it is still more difficult to make a soybean curd of high quality because the soybean milk is also unevenly manufactured. This is because that soybean milk obtained from a uniformly and sufficiently heated bean juice (of high quality) not only promptly reacts to a coagulant but also is mixed therewith quickly as compared with the unevenly manufactured soybean milk. That is, when a coagulant such as a nigari or the like is added to soybean milk manufactured from an unevenly cooked bean juice in the manufacture of a soybean curd, the coagulant is concentrated at the portion of the soybean milk which was obtained from the sufficiently heated portion of the bean juice before a coagulanting reaction occurs to the entire soybean milk, the soybean milk is reacted to the coagulant promptly, and thus the coagulant cannot be uniformly mixed with the entire soybean milk. As a result, there is a problem that a soybean curd of high quality having elasticity and a sufficient water keeping property cannot be still more manufactured.

Incidentally, since steam is obtained by simply heating ordinary water in the conventional bean-juice-manufacturing caldron, it cannot be avoided for air to be mixed with the steam when it is manufactured so that oxygen is contained in the steam. When a raw material of bean juice is boiled with the steam in which the oxygen is mixed, it is also mixed with or dissolved in soybean milk obtained by separating an okara from bean juice. Thus, there is a problem that the soybean milk is deteriorated in a very short period of time and a soybean curd of high quality cannot be manufactured from the soybean milk as well as a lot of porosities are formed in the soybean curd due to the dissolved oxygen and the taste thereof becomes deterigated. To cope with this problem, a fresh soybean milk must be used at once for the manufacture of a soybean curd. Thus, a soybean curd of high quality is manufactured only by a speciality manufacturers and it is impossible to supply a fresh soybean curd to homes and eating houses.

Further, soybean milk is an excellent drink which does not cause atopic dermatitis and allergy symptoms different from a cow's milk regardless of that it is as nutritious as the cow's milk and less expensive. However, a fresh soybean milk manufactured from the conventional bean-juice-manufacturing caldron cannot be stored for a long time unless it is sterilized at high temperature. However, when the soybean milk is sterilized at high temperature, it is somewhat denatured and the deliciousness characteristic to the soybean milk is lost. Consequently, there is also a problem that a fresh soybean milk having deliciousness and a good taste is sold only in the vicinity of a small-scaled speciality soybean curd manufacturers in a very small quantity and cannot be freely distributed in a market.

A leading subject of the present invention is to solve the above problems of the conventional techniques and to provide soybean milk of high quality, soybean packs into which the soybean milk of high quality is filled, soybean milk manufacturing method capable of manufacturing the soybean milk of high quality and soybean milk pack manufacturing method of manufacturing the soybean milk packs.

The soybean milk of high quality can be obtained by separating a solid matter from a uniformly boiled bean juice of high quality obtained by using a novel caldron. The soybean milk can be stored without the need of high temperature sterilization while keeping the sweet taste, smell, deliciousness and freshness characteristic to the soybean milk; is less deteriorated even if it is stored; and can be drunk as a drink as it is, in addition to that it is used as a raw material of a soybean curd of high quality. The soybean milk packs can be stored for a long time; can be handled easily; and can be supplied to an ordinary home and an eating house as well as to a speciality soybean curd manufacture.

Another subject of the present invention is to provide a soybean curd manufacturing method capable of supplying a just cooked and fresh soybean curd of high quality which can be manufactured easily in a short time by a nonprofessional in ordinary homes and eating houses, in addition to speciality soybean curd manufacturers, using the soybean milk of high quality and the soybean milk packs. The soybean curd made by the method is of high quality, namely, fresh, tasteful, delicious and mild felt on the tongue and has a good water keeping property without porosities formed therein.

DISCLOSURE OF THE INVENTION

To solve the above problems, a first aspect of the present invention provides soybean milk which is characterized by containing soybean protein suspended therein and oxygen dissolved therein in an amount of 5 ppm or less without heat treatment.

It is preferable that the soybean milk contains substantially no oxygen dissolved therein.

A second aspect of the present invention provides a soybean milk pack which is characterized by comprising soybean milk containing soybean protein suspended therein and oxygen dissolved therein in an amount of 5 ppm or less without heat treatment and a pack container into which the soybean milk is filled, and which is stored at a temperature of 1° C.–10° C.

It is preferable that the soybean milk pack contains substantially no oxygen dissolved in the soybean milk and substantially no oxygen mixed therewith when the soybean milk is filled into the pack container.

A third aspect of the present invention provides a soybean milk manufacturing method which is characterized by comprising the steps of immersing soybeans in water for a predetermined time; grinding the thus obtained swelled soybeans; extracting soybean protein by boiling the thus obtained ground soybeans with superheated steam evaporating from water processed by an oxygen removing treatment and containing little or no oxygen (hereinafter, referred to as superheated oxygen-free-steam) for a predetermined time; obtaining boiled bean juice containing the extracted soybean protein; and manufacturing soybean milk in which the soybean protein is suspended and which contains oxygen dissolved therein in an amount of 5 ppm or less by separating an okara as a solid matter from the thus obtained boiled bean juice without cooling it in an oxygen-free environment.

It is preferable that the oxygen in the superheated oxygen-free-steam and the oxygen dissolved in the soybean milk are not substantially contained.

A fourth aspect of the present invention provides a soybean milk pack manufacturing method which is characterized by comprising the steps of immersing soybeans in water for a predetermined time; grinding the thus obtained swelled soybeans; extracting soybean protein by boiling the thus obtained ground soybeans with superheated oxygen-free-steam for a predetermined time; obtaining boiled bean juice containing the extracted soybean protein; manufacturing soybean milk in which the soybean protein is suspended and which contains oxygen dissolved therein in an amount of 5 ppm or less by separating an okara as a solid matter from the thus obtained boiled bean juice without cooling it in an oxygen-free environment; filling the thus manufactured soybean milk into a pack container preferably in an oxygen-free environment without heating it and without cooling it; and thereafter cooling and storing the soybean milk pack at a temperature of 1° C.–10° C. or less.

It is preferable that oxygen in the superheated oxygen-free-steam, the oxygen dissolved in the soybean milk and oxygen mixed when the soybean milk is filled into the pack container are not substantially contained.

A fifth aspect of the present invention provides a soybean curd manufacturing method which is characterized by comprising the steps of filling the soybean milk manufactured by the soybean milk manufacturing method of the third aspect of the present invention into a soybean curd manufacturing insulated container or tearing open the soybean milk pack manufactured by the soybean milk pack manufacturing method of the fourth aspect of the present invention and filling the soybean milk contained therein into the soybean curd manufacturing insulated container; adding a suitable amount of a coagulant to the soybean milk in the soybean curd manufacturing insulated container and sufficiently mixing the coagulant with the soybean milk; disposing non-corrosive electrodes in the mixed solution of the coagulant and the soybean milk on both the sides of the soybean curd manufacturing insulated container; passing an alternating current between the non-corrosive electrodes under such conditions that no electrolysis occurs in the mixed solution; and manufacturing a soybean curd by coagulating the soybean protein by heating the mixed solution from passing of the alternating current.

It is preferable that the ground soybeans are boiled with the superheated oxygen-free-steam to obtain boiled bean juice for manufacturing the soybean curd by the steps of using a caldron comprising a caldron main body having a charge port disposed in the vicinity of an end thereof and a discharge port disposed in the vicinity of the other end thereof with both the ends closed, at least a steam injection pipe installed in the caldron main body and having a plurality of steam injection ports disposed along the longitudinal direction of the caldron main body and a steam generation means, wherein the superheated oxygen-free-steam is injected from the steam injection ports in an inclined direction and direction from radial direction of the steam injection pipe so as to be supplied in a circumferential direction in the caldron main body; charging the ground soybeans through the charge port; supplying the superheated oxygen-free-steam generated by the steam generation means to the steam injection pipe; injecting the superheated oxygen-free-steam from the plurality of steam injection ports of the steam injection pipe and supplying the same in a circumferential direction of the caldron main body; extracting soybean protein by mixing the ground soybeans with the superheated oxygen-free-steam and stirring the mixture of them while fluidizing the ground soybeans and boiling the ground soybeans; and discharging the boiled bean juice containing the extracted soybean protein through the discharge port.

It is preferable that the superheated oxygen-freesteam injected from the plurality of steam injection ports of the steam injection pipe are supplied in the same circumferential direction in the caldron main body, or the superheated oxygen-free-steam injected from a portion of the plurality of steam injection ports and the superheated oxygen-free-steam injected from the remaining portion thereof are supplied in opposite circumferential directions in the caldron main body, respectively.

It is preferable that the caldron further comprises a cooling means disposed to the caldron main body on a discharge side thereof for cooling the boiled raw material and the remaining steam in the caldron main body.

It is preferable that the steam generation means includes an oxygen removing means.

It is preferable that the superheated oxygen-free-steam is superheated steam substantially containing no oxygen.

Further, it is preferable that the coagulant is nigari.

BEST MODE OF CARRYING OUT THE INVENTION

Figure 1:
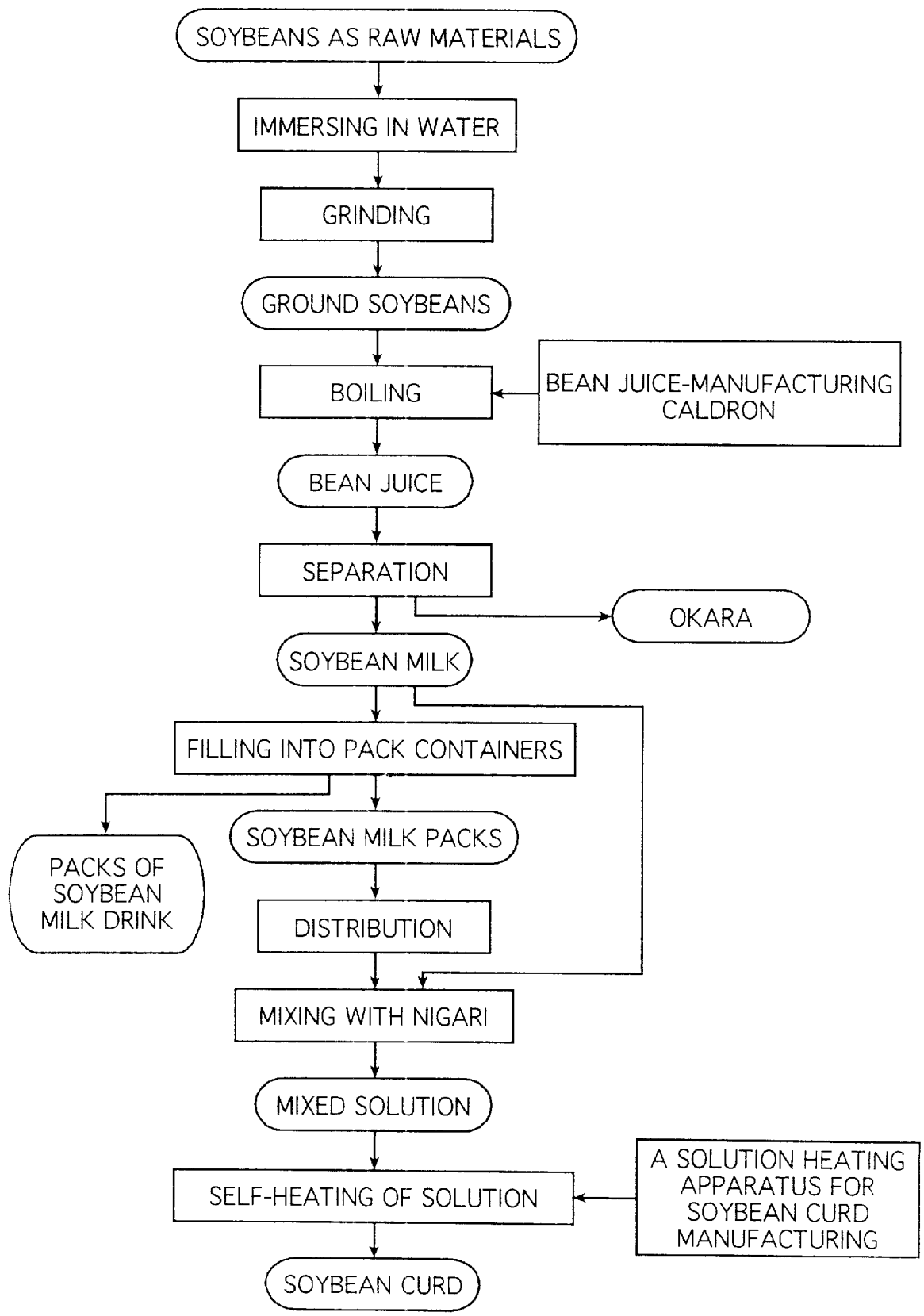
FIG. 1 is a flowchart showing a flow of a soybean curd manufacturing system to which a soybean curd manufacturing method according to the present invention is applied.

Soybean milk, soybean milk packs, methods of manufacturing the soybean milk and the soybean milk packs and a method of manufacturing soybean curd by using them according to the present invention will be described below in detail with reference to preferable embodiments shown in the accompanying drawings.

First, soybean milk of a first aspect of the present invention is characterized in that the content of oxygen dissolved in the soybean milk is 5 ppm or less or preferably substantially 0 ppm, that is, no oxygen is contained therein in a state that soybean protein, which is obtained by separating a solid matter such as an okara and the like from bean juice (boiled bean juice), is suspended in the soybean milk, that is, in a state that the soybean milk is not processed by a heat treatment such as a high temperature sterilizing treatment or the like. Incidentally, ordinary water contains oxygen of 8–10 ppm. The concentration of the soybean protein in the soybean milk of the present invention is not particularly limited, it is preferably 12% or more, more preferably 13% or more in a state that it is obtained by separating the solid matter such as the okara and the like from the bean juice (boiled bean juice), that is, in a state that the heat treatment such as a concentration treatment and the like is not carried out. While the upper limit of the concentration of the soybean protein is not particularly limited, it is preferably as high as possible. However, the concentration of the soybean protein which can be actually achieved without subjecting the soybean protein to the concentration treatment is about 15% to 16%.

The soybean milk of the present invention has the deliciousness and sweet taste of soybeans, freshness and good taste, smell and deliciousness as a fresh soybean milk and is excellent as a raw material of a tasteful soybean curd having a good taste and deliciousness without porosities caused by dissolved oxygen. In addition to the above, the soybean milk is tasteful even if it is drunk as a drink, and can be drunk even by a person with atopic dermatitis and allergy symptoms in place of a cow's milk.

Note that when the soybean milk obtained by separating the okara from the bean juice is processed by the heat treatment such as the high temperature sterilizing treatment, the concentration treatment and the like, the dissolved oxygen can be reduced or made to substantially 0 ppm as well as the concentration thereof can be increased. However, when the soybean milk is processed by the heat treatment, their freshness, taste, smell, deliciousness and the like as the soybean milk are lost. In addition, when a soybean curd is manufactured from the thus heat-treated soybean milk, the taste and deliciousness thereof are lost. Thus, the heat treatment is not preferable to the soybean milk because a tasteful soybean curd cannot be manufactured therefrom.

When the soybean milk of the present invention is not in contact with an oxygen-containing-atmosphere such as air and the like and further preferably stored at a low temperature in the temperature range 1–10° C., it can be stored while keeping a good taste, flavor and deliciousness in a fresh state, that is, without deteriorating the high quality thereof for one week from the date it was manufactured when the amount of oxygen dissolved in the soybean milk is 5 ppm or less, for three weeks when the amount of oxygen dissolved therein is 2 ppm or less and for one month when the amount of oxygen dissolved therein is substantially 0 ppm. Note that when the soybean milk of the present invention is stored in the more preferable temperature range of 2–5° C., it can be stored a longer period of time.

The soybean milk packs of a second aspect of the present invention are characterized in that the soybean milk of the first aspect of the present invention is filled into pack containers in such a manner that mixed oxygen in the soybean milk packs is preferably made to substantially 0 ppm, that is, no oxygen is contained therein in a state that soybean protein which is obtained by separating a solid matter such as an okara and the like from bean juice (boiled bean juice) is suspended in the soybean milk of the first aspect of the present invention, that is, in a state that the soybean milk is neither processed by a high temperature sterilizing treatment nor cooled; and that the soybean milk packs are stored at a low temperature of 1–10° C. and more preferably 2–5° C.

When the soybean milk packs of the present invention are stored at a low temperature in the temperature range of 1–10° C. and more preferably 2–5° C., they can be stored while keeping a good taste, flavor and deliciousness, that is, without deteriorating the quality thereof for one week from the date they were manufactured when the amount of oxygen dissolved in the soybean milk and the oxygen mixed with the packs is 5 ppm or less, for three weeks when the amount of them is 2 ppm or less and for one month when the amount of them is substantially 0 ppm.

The pack containers into which the soybean milk of the present invention is filled are not particularly limited so long as they are pack containers used for foodstuffs and are not harmful at a high temperature of 50–99° C., at a low temperature of 1–10° C. and at an intermediate temperature therebetween. However, pack containers such as antibactrial pack containers to which oxygen is not permeable are preferable and, for example, polyolefin resin containers and bags, pack containers and bags on which a polyolefin resin film is coated and vinyl containers can be exemplified.

Not only the soybean milk packs of the present invention can be stored for a long period of time but also contents of the containers is suitable for easy transportation. Therefore, the soybean milk packs can be supplied to ordinary homes and eating houses as well as to speciality soybean curd manufacturers as a material of a tasteful soybean curd without a nest where germs breed and without porosities which are caused by dissolved oxygen or as a tasteful soybean milk drink which can be drunk as it is. Further, the soybean milk packs can be stored in a consumer refrigerator as well as in a commercial-use refrigerator.

The soybean milk and the soybean milk packs can be manufactured by soybean milk and soybean milk packs manufacturing methods of a third and fourth aspects of the present invention, in a soybean curd manufacturing system to which a soybean curd manufacturing method of a fifth aspect of the present invention is applied. The above respective methods and system will be shown below.

FIG. 1 schematically shows a view explaining the soybean curd manufacturing system to which the soybean milk, soybean milk packs and soybean curd manufacturing methods of the third, fourth and fifth aspects of the present invention are applied.

First, the soybean milk manufacturing method of the third aspect of the present invention will be performed in the soybean curd manufacturing system of the present invention.

In the soybean milk manufacturing method, first, soybeans as a raw material are immersed in water for a predetermined time and swelled. Next, the thus obtained swelled soybeans are ground. A method and means for grinding the swelled soybeans are not particularly limited and a conventionally known grinding method and means may be used. While the soybeans immersed in the water are ground here, the present invention is not limited thereto and soybeans ground in a dry state may be swelled by being immersed in water.

The obtained ground soybeans are boiled for a predetermined time with superheated steam evaporating from water subjected to an oxygen removing treatment and containing substantially no oxygen and soybean protein is extracted therefrom without losing the flavor and deliciousness thereof, whereby bean juice (boiled bean juice) of high quality containing the extracted soybean protein is obtained. Incidentally, since ordinary water contains oxygen in the amount of 8–10 ppm, it is preferable to produce steam from water from which oxygen is removed as much as possible. The bean juice of high quality can be successively manufactured for the first time by a novel bean-juice-manufacturing caldron shown in FIG. 2 to FIG. 8.

While the swelled and ground soybeans are used as they are as the raw material of bean juice to be charged into the bean-juice-manufacturing caldron here, the present invention is not limited thereto. That is, the swelled and ground soybeans may be preparatorily heated to promote the extraction of soybean protein in the bean-juice-manufacturing caldron so that the soybeans can be easily boiled or soybeans crushed or ground in a dry state may be directly charged into the bean-juice-manufacturing caldron without being mixed with water and being swelled.

A temperature at which the superheated oxygen-free-steam used to boil the material of bean juice is supplied is not particularly limited so long as the soybean protein can be extracted at the temperature and it is ordinarily 110° C. or higher. However, it is preferable to set the temperature to 150–190° C. when it is desired to obtain the deliciousness of soybeans and to 180–190° C. when it is desired to particularly increase the deliciousness of soybeans. However, it is contemplated that an excessively high temperature changes the nature of extracted soybean protein, the temperature of steam is preferably set to 110–120° C. in an ordinary boiling and the temperature may be suitably set in accordance with soybeans condition and a desired level of taste.

A pressure at which the superheated oxygen-free-steam is supplied is not particularly limited so long as soybeans can be boiled at the pressure uniformly. However, it is preferable to set the pressure to, for example, 5–7 kg/cm2 for the effective boiling of soybeans.

In this manner, bean juice of high quality, which has been uniformly and sufficiently boiled without unevenness can be obtained by the novel bean-juice-manufacturing caldron.

The novel bean-juice-manufacturing caldron used in the boiling step of the present invention will be described later.

The bean juice obtained by using the novel bean-juice-manufacturing caldron is discharged therefrom at a high temperature of 90–99° C. Then, an okara as a solid matter is separated from the heated bean juice without cooling in the temperature range of, for example, 80–95° C. preferably in an oxygen-free state, whereby the soybean milk of the first aspect of the present invention can be manufactured, that is, soybean milk having soybean protein suspended therein can be manufactured. At the time, an amount of the oxygen dissolved in the soybean protein is 5 ppm or less and preferably substantially 0 ppm (no dissolved oxygen contained).

A separating method and means used in the process for separating the okara as the solid matter from the bean juice of high quality obtained by the present invention are not particularly limited and a conventionally known separating method and means and a conventionally known filtering method and means may be used. However, it is preferable that the separation be performed in a substantially oxygen-free environment.

Since the thus obtained soybean milk contains little or substantially no dissolved oxygen even if it is not processed by a heat treatment such as a high temperature sterilizing treatment and the like, no germs breed therein and the soybean milk can be stored for a long time while keeping its freshness without the deterioration of the taste and deliciousness thereof. Further, the concentration of the soybean protein in the obtained soybean milk is higher than that in a conventional soybean milk even if it is not subjected to a heat treatment such as a concentration treatment. That is, the concentration therein reaches 13–16% in contrast to the concentration in the conventional soybean milk of 10–12%.

The soybean milk manufacturing method of the third aspect of the present invention is basically arranged as described above.

Next, the soybean milk pack manufacturing method of the fourth aspect of the present invention will be described.

In the soybean milk pack manufacturing method of the aspect, the soybean milk of the first aspect of the present invention is manufactured according to the soybean milk manufacturing method of the third aspect of the present invention. Accordingly, the description of the process in which the soybean milk is manufactured is omitted.

The soybean milk manufactured according to the soybean milk manufacturing method of the third aspect of the present invention is filled into pack containers while maintaining a temperature of 80–95° C. preferably in an oxygen-free environment in which no oxygen is mixed and preferably no oxygen is substantially contained without being processed by a heat treatment such as a high temperature sterilizing treatment, a concentration treatment and the like and by a cooling treatment.

The soybean milk packs of the second aspect of the present invention can be manufactured as described above.

In the obtained soybean milk packs, even if soybean milk is filled into pack containers in an oxygen containing environment and germs are mixed with the soybean milk, they are sterilized at high temperature because the soybean milk in the pack containers is at a high temperature of 80–95° C. just after it is filled thereinto. Further, even if germs remain in the soybean milk without being perfectly sterilized, they cannot breed because the oxygen dissolved in the soybean milk packs and the oxygen mixed with the soybean milk when it is filled into the pack containers is little or substantially zero. Accordingly, the soybean milk packs of the second aspect of the present invention can be stored for a long time.

In the soybean milk pack manufacturing method of the fourth aspect of the present invention, it is preferable to cool or preferably rapidly cool the soybean milk just after it is filled into the pack containers and to store it at 1–10° C. or less, preferably at 1–5° C. and more preferably at 2–5° C. With this treatment, even if germs, which are not sterilized even by the filling of the soybean milk at high temperature, remain in the soybean milk in the soybean milk packs of the present invention, they are sterilized at low temperature while the soybean milk is stored at a low temperature. Further, even if germs remain in the soybean milk without being sterilized at low temperature, they neither breeds nor is active because the oxygen dissolved in or mixed with the soybean milk is little or do not substantially exist.

Therefore, the soybean milk packs of the present invention can be stored for a long period of time.

In the manner as described above, the soybean milk packs, which can be stored for a long period of time, can be manufactured. The soybean milk packs can be distributed and transported to homes and eating houses as well as to speciality soybean curd manufacturers in accordance with application thereof and can be easily stored thereby.

The soybean milk pack manufacturing method of the fourth aspect of the present invention is basically arranged as described above.

Next, the soybean curd manufacturing method of the fifth aspect of the present invention will be described.

In the soybean curd manufacturing method of the aspect, the soybean milk of the first aspect of the present invention is manufactured according to the soybean milk manufacturing method of the third aspect of the present invention, and the soybean milk packs of the second aspect of the present invention are manufactured according to the soybean milk pack manufacturing method of the fourth aspect of the present invention. Therefore, the description of the process in which the soybean milk is manufactured and description of the process in which the soybean milk packs are manufactured are omitted.

The soybean milk of the first aspect of the present invention, which is manufactured according to the soybean milk manufacturing method of the third aspect of the present invention and stored at low temperature when necessary, is directly charged into the soybean curd manufacturing insulated container of a solution heating apparatus for soybean curd manufacturing. Otherwise, the soybean milk packs of the second aspect of the present invention, which are manufactured according to the soybean milk pack manufacturing method of the fourth aspect of the present invention, distributed, and stored at low temperature when necessary, are tore open and the soybean milk contained in the packs is charged into the soybean curd manufacturing insulated container.

Subsequently, the soybean milk in the soybean curd manufacturing insulated container is added with an appropriate amount of a coagulant, preferably calcium chloride or nigari mainly composed of calcium chloride and sufficiently mixed therewith. After both of them are sufficiently mixed, the non-corrosive electrodes of the solution heating apparatus for soybean curd manufacturing are immersed in the mixed solution of the soybean milk and the coagulant on both the sides of the soybean curd manufacturing insulated container.

Next, an alternating current is passed between the non-corrosive electrodes from the power supply of the solution heating apparatus for soybean curd manufacturing under such conditions that no electrolysis occurs in the mixed solution of the soybean milk and the coagulant, whereby the mixed solution is heated and soybean protein is coagulated so that a soybean curd can be manufactured.

The soybean curd manufacturing insulated container, the non-corrosive electrodes and the solution heating apparatus for soybean curd manufacturing having the power supply, which are used in the process for coagulating the soybean milk, will be described later.

In the aspect, it is preferable to charge a cooled soybean milk of low temperature into the soybean curd manufacturing insulated container. The reason is that since the soybean milk of the present invention is soybean milk of high quality without being unevenly boiled, when its temperature is high, the condensing and coagulating reaction of the soybean milk with the coagulant is promptly performed and thus the nigari cannot be uniformly mixed with all the soybean milk in the container. A mixing quantity of the soybean milk of the present invention with the nigari is not particularly limited and a conventional mixing quantity can be employed. For example, when soybean milk has a concentration of 12–15%, it is preferable to mix a nigari of about 3–4% as a concentration of magnesium chloride. Further, as to a heating temperature and a heating time, when the initial temperature of soybean milk is about 10° C., the soybean milk can be coagulated and made to a soybean curd in about 15 minutes from start of heating because a necessary heating temperature is 75–90° C.

As described above, according to the soybean curd manufacturing method of the fifth aspect of the present invention, a fresh, tasteful, moderate and delicious soybean curd of high quality without porosities formed therein which is mild on the tongue and has a good water holding property can simply manufactured even by a nonprofessional in ordinary homes and eating houses, in addition to speciality soybean curd manufacturers, by using the soybean milk and soybean milk packs of high quality of the present invention. As a result, a just cooked fresh soybean curd can be supplied to the table.

Since the obtained soybean curd contains little or substantially no dissolved oxygen even if it is manufactured by a nonprofessional, no porosity is formed therein.

While the soybean curd manufacturing insulated container, and the solution heating apparatus for soybean curd manufacturing having the non-corrosive electrodes and the power supply are used in the process for coagulating the soybean milk, the present invention is not limited thereto and any heating system may be employed so long as the mixed solution of the soybean milk and the coagulant in the container can be directly heated different from the conventional system of heating it from the outside, and for example, an electromagnetic heating system, a high frequency heating system, and the like are applicable.

The soybean curd manufacturing method of the fifth aspect of the present invention is basically arranged as described above.

Next, the novel bean-juice-manufacturing caldron used in the boiling process of the soybean milk, soybean milk packs and soybean curd manufacturing methods of the third, fourth and fifth aspects of the present invention will be described below.

Figure 2:
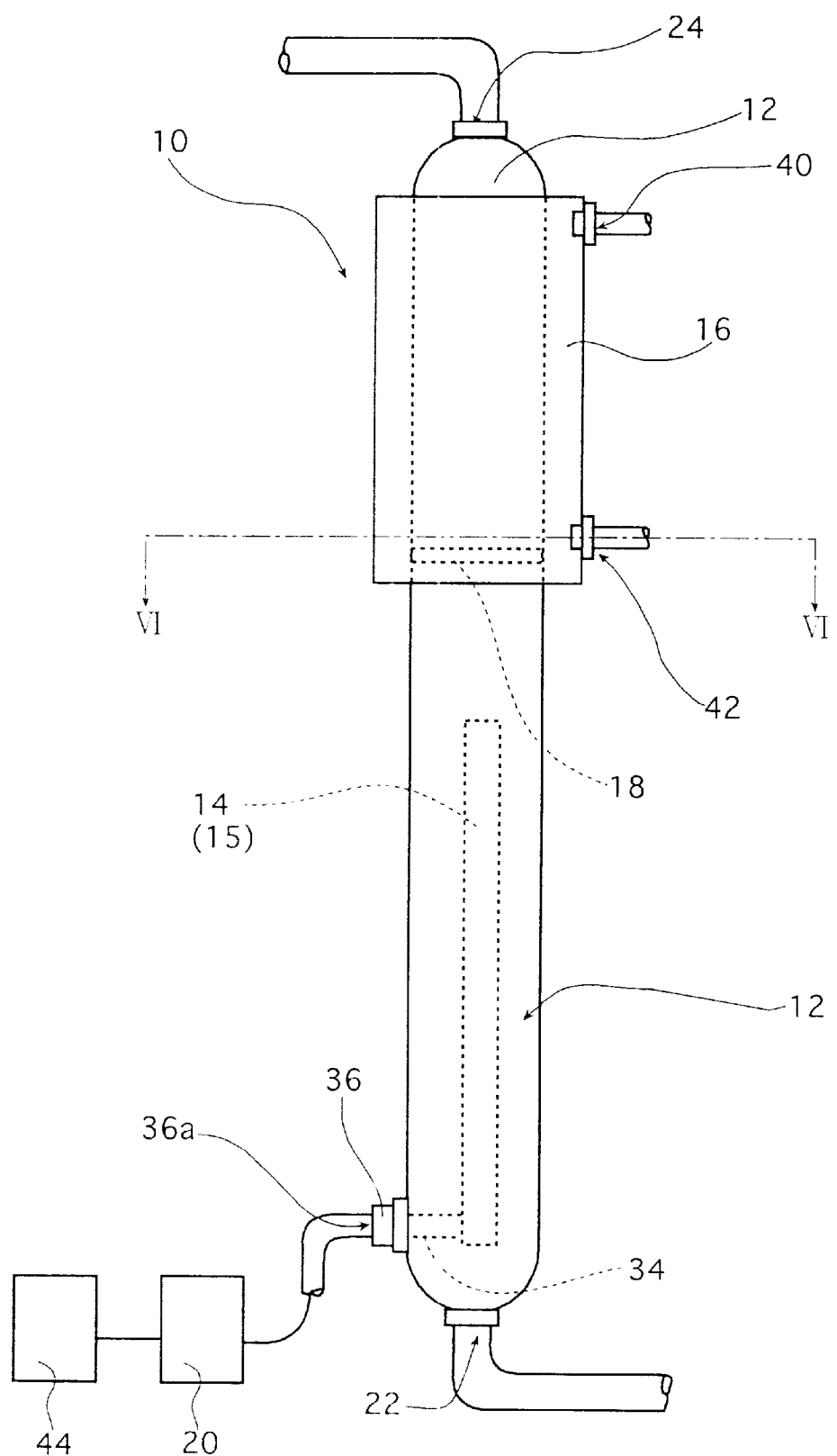
FIG. 2 is a front elevational view of an embodiment a caldron used in a boiling step in soybean milk manufacturing method according to the present invention.

FIG. 2 is a front elevational view of an embodiment of the bean-juice-manufacturing caldron applied to the boiling process of the present invention. A bean-juice-manufacturing caldron installed vertically will be described here as a typical example, the bean-juice-manufacturing caldron of the present invention is not limited thereto.

The bean-juice-manufacturing caldron 10 shown in FIG. 2 comprises a cylindrical caldron main body 12 installed vertically, a steam injection pipe 14 (or 15) installed upright in the caldron main body 12 at the lower central portion thereof, an annular water-cooling jacket 16 as a cooling means disposed around the outer periphery of the caldron main body 12 at the upper portion thereof, an orifice plate 18 disposed in the caldron main body 12 between the steam injection pipe 14 (or 15) and the water-cooling jacket 16 and a steam generation means 20 disposed externally of the caldron main body 12 for supplying superheated steam into the steam injection pipe 14 (or 15).

The bean-juice-manufacturing caldron 10 shown in FIG. 2 is arranged such that various kinds of steam injection pipes can be replaceably installed thereto. For example, the steam injection pipe 14 having a structure shown in FIG. 4 and the steam injection pipe 15 shown in FIG. 8 which will be described later, and other steam injection pipes having a structure other than the above can be replaceably used for various applications such as main boiling, additional boiling and other boiling.

Figure 3:
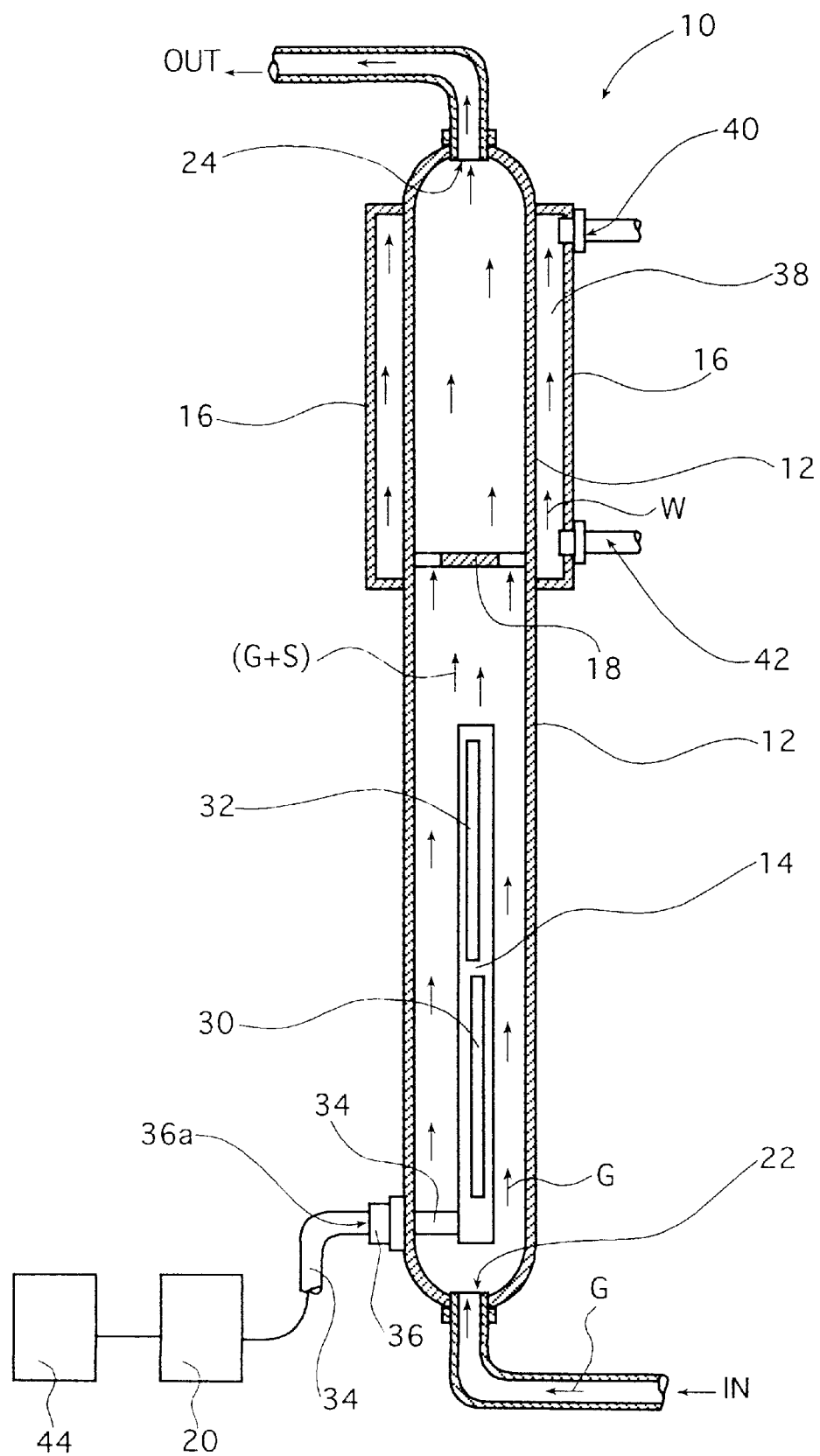
FIG. 3 is a longitudinal sectional view of the caldron shown in FIG. 2.
Figure 4:
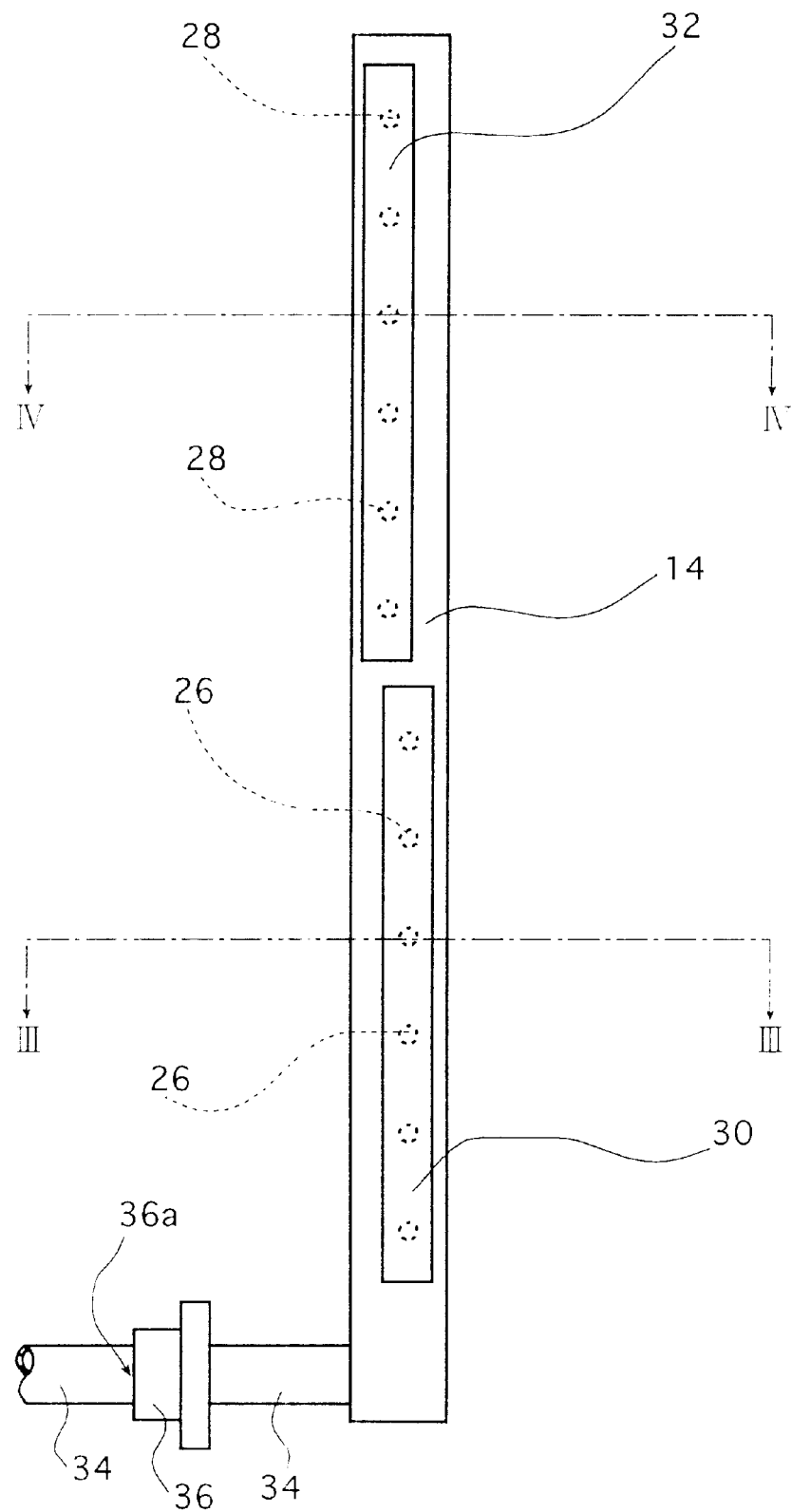
FIG. 4 is a front elevational view of a steam injection pipe used in the caldron shown in FIG. 3.

First, the bean-juice-manufacturing caldron 10 shown in FIG. 3 to which the steam injection pipe 14 shown in FIG. 4 is applied will be described below.

FIG. 3 is a longitudinal sectional view of the bean-juice-manufacturing caldron 10 shown in FIG. 2.

In FIG. 2 and FIG. 3, the caldron main body 12 boils a raw material G of bean juice and the heated material thereof (which are hereinafter generically referred to by the term "material of bean juice") with the steam S injected from the steam injection pipe 14 (refer to FIG. 5 and FIG. 6). The caldron main body 12 is composed of a cylindrical stainless steel pipe with both the ends thereof formed to a semi-spherical shape and closed and has a charge port 22 disposed to the semi-spherical bottom portion thereof and a discharge port 24 disposed to the semi-spherical top portion thereof. The material of bean juice is charged through the charge port 22. In the caldron main body 12, after the raw material G of bean juice is boiled with the steam S injected from the steam injection pipe 14, the steam S is cooled by the water-cooling jacket 16 in the upper portion of the caldron main body 12 and liquefied and condensed so that the pressure thereof is reduced. As described above, the steam injected in a circumferential direction from the steam injection pipe 14 and fluidizes the raw material G of bean juice in the lower portion of the caldron main body 12 and then the steam is cooled and condensed in the upper portion of the caldron main body 12, so the continuously charged raw material G of bean juice is fluidized from the lower charge port 22 to the upper discharge port 24 while being boiled so that it smoothly move upward spirally. Thus, the bean juice, which has been sufficiently and uniformly boiled, can be successively and smoothly discharged from the discharge port 24.

The steam injection pipe 14 injects superheated steam into the caldron main body 12 to boil the raw material G of bean juice charged through the charge port 22 in the caldron main body 12 and to move it in the circumferential direction in the caldron main body 12, that is, to move upward it spirally therein. In the illustrated example, the steam injection pipe 14 is composed of a stainless steel pipe installed upright in the caldron main body 12 from the bottom to a central portion thereof. As shown in FIG. 4, the upper end of the steam injection pipe 14 is closed and a plurality of injection ports 26 and 28 are formed along each of the same straight lines extending in the vertical direction of the steam injection pipe 14.

Figure 5:
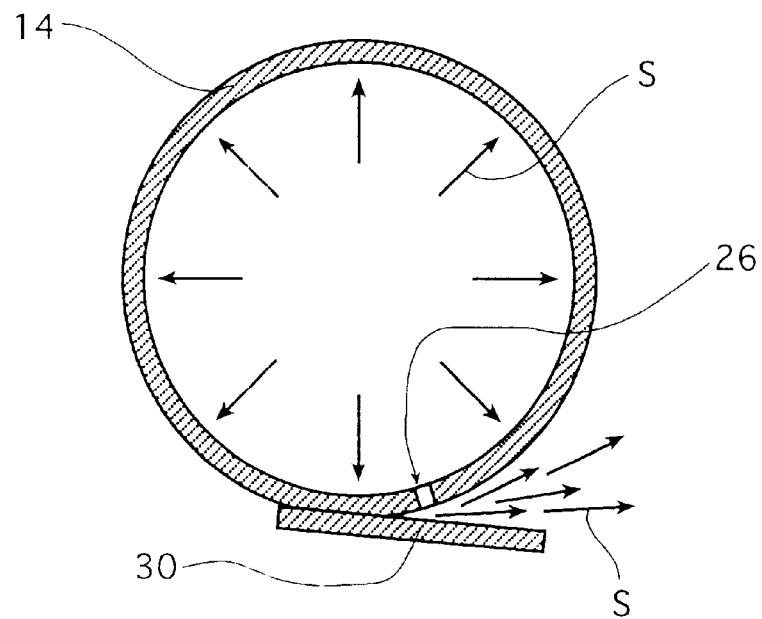
FIG. 5 is a sectional view of a steam injection pipe taken along the line III—III shown in FIG. 4.
Figure 6:
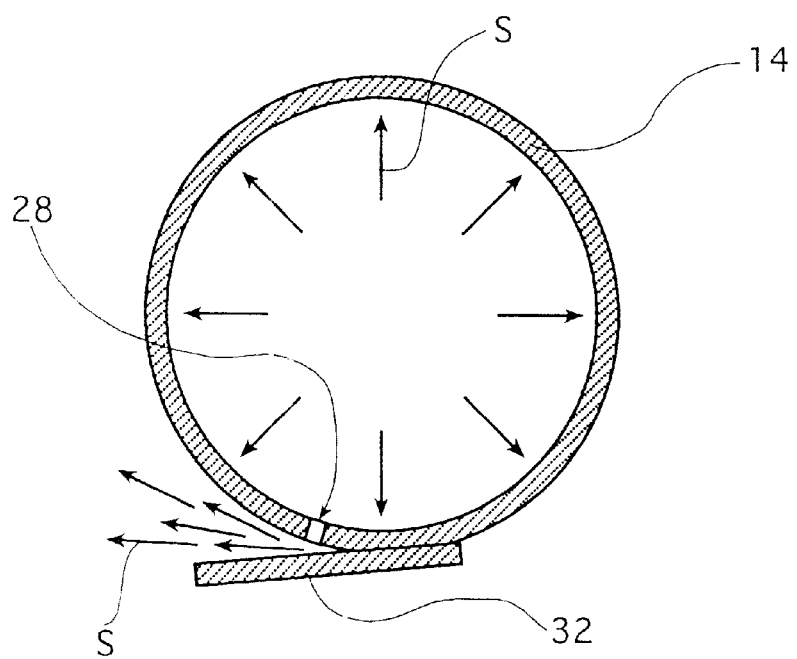
FIG. 6 is a sectional view of the steam injection pipe taken along the line IV—IV shown in FIG. 4.
Figure 7:
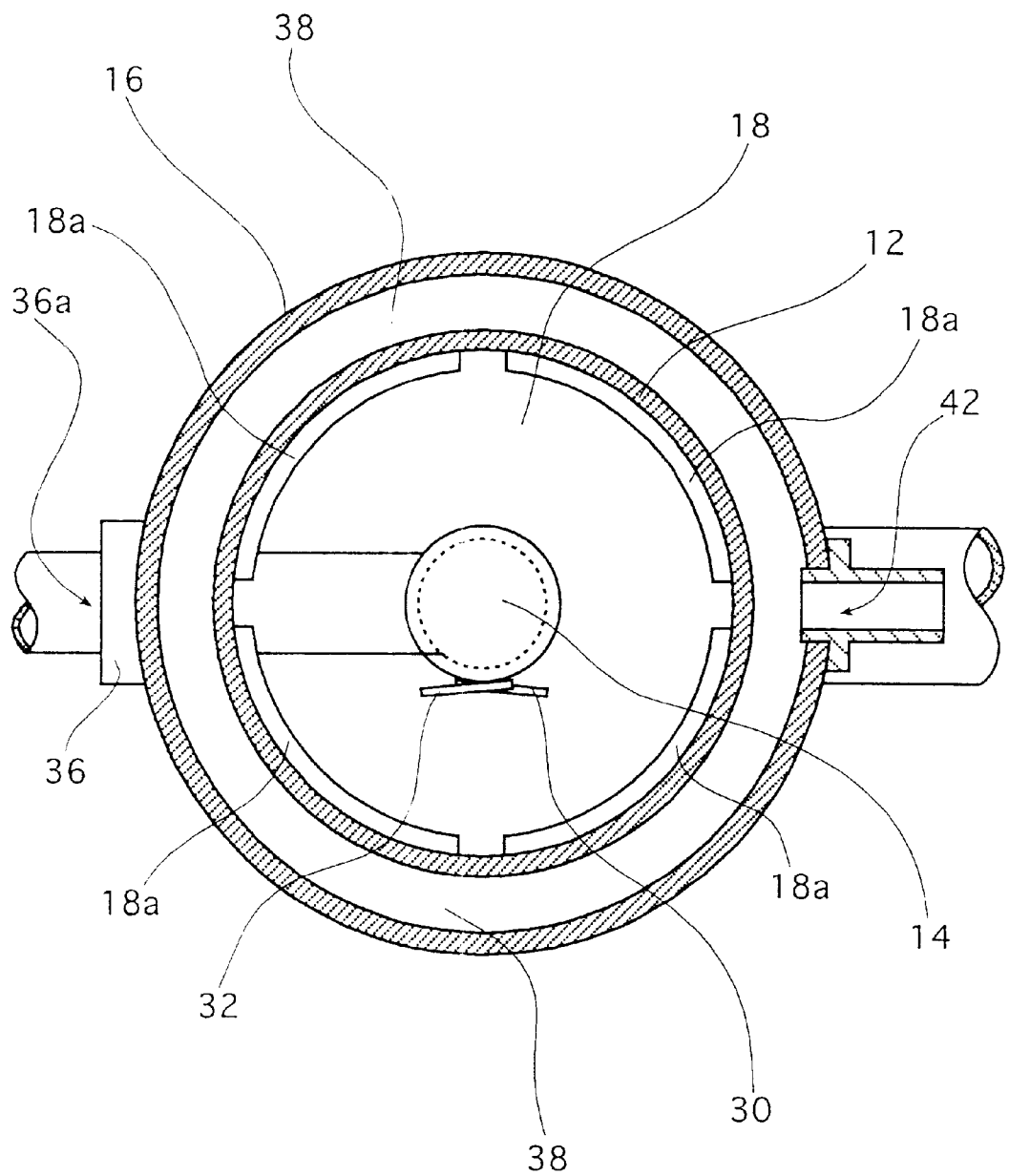
FIG. 7 is a sectional view of the caldron taken along the line VI—VI shown in FIG. 2.

As shown in FIG. 5, a lower deflector 30 is mounted in the vicinity of the lower injection ports 26 of the steam injection pipe 14 on the left side thereof for changing the direction of the steam S injected from the injection ports 26 so that they are directed from a radial direction to a direction inclined rightward in the figure, for example, so that they are directed rightwards in a tangential direction. The lower deflector 30 is mounted to the steam injection pipe 14 with the left side portion thereof attached to the steam injection pipe 14 in the vicinity of the left side of the lower injection ports 26 in the figure such that it covers the lower injection ports 26 obliquely, that is, in a tangential direction in the illustrated example at a position near to them. In contrast, as shown in FIG. 6, an upper deflector 32 is mounted to the stream injection pipe 14 in the vicinity of the right side of the upper injection ports 28 of the steam injection pipe 14 on the right side thereof so as to cover the upper injection ports 28 obliquely, that is, in a tangential direction in the illustrated example at a position near to them. As a result, the upper deflector 32 deflects the steam S injected from the upper injection ports 28 so that the direction thereof is deflected from a radial direction to a direction inclined leftwards so that it is directed, for example, leftwards in a tangential direction.

As described above, the lower deflector 30 and the upper deflector 32, which are mounted on the steam injection pipe 14 in an opposite direction, permits the steam from the injection ports 26 and 28, which are located at the upper half portion and the lower half portion of the steam injection pipe 14, to be injected in opposite circumferential directions. As a result, in the caldron 10 of the illustrated example, the steam S injected from the upper injection ports 28 of the steam injection pipe 14 can be caused to come into contact with the raw material G of bean juice sufficiently and uniformly and the heat of the steam can be sufficiently transmitted thereto, whereby the raw material G of bean juice is uniformly and sufficiently boiled. Therefore, since all the steam S reaching the upper portion of the caldron main body 12 sufficiently lower their temperature and a part or all of the steam S can be liquefied and condensed, steam S, which remain residually at high temperature while keeping a sufficient quantity of heat capable of boiling the raw material G of bean juice, can be almost eliminated.

Further, as shown in FIGS. 2, 3 and 4, the lower end of the steam injection pipe 14 is also closed, and a steam supply pipe 34 is connected perpendicular to the steam injection pipe 14 in the vicinity of the lower end thereof. The steam supply pipe 34 is fixed to a mounting section 36 with a steam supply port 36a located at a lower portion of the caldron main body 12 so as to extend to the outside through the caldron main body 12. The steam supply pipe 34 extending to the outside of the caldron main body 12 is connected to the steam generation means 20 such as a boiler or the like for generating superheated steam.

The water-cooling jacket 16 is disposed around the outer peripheral wall of the caldron main body 12 at the upper portion thereof, formed to an annular shape and has closed upper and lower end portions. The interior of the water-cooling jacket 16 is arranged as an annular cooling chamber 38 which can be filled with a cooling water. Further, a cooling water discharge port 40 and a cooling water charge port 42 are disposed to the water-cooling jacket 16 on the upper and lower sides thereof, respectively. With this arrangement, the water-cooling jacket 16 sufficiently liquefies and condenses the steam S whose temperature is lowered through the function thereof for sufficiently boiling the raw material G of bean juice and making it to bean juice, to thereby lower the pressure of the upper portion of the caldron main body 12 and preferably to provide a pressure reduced atmosphere in the upper portion thereof.

The provision of the water-cooling jacket 16 can sufficiently liquefy and condense the steam reaching the upper portion of the caldron main body 12 and having lowered temperature. In addition, even if high temperature remaining steam reaches the upper portion of the caldron main body 12, it can be sufficiently cooled, liquefied and condensed by the water-cooling jacket 16. Thus, such an adverse effect of high temperature remaining steam, which arises in a conventional caldron, can be eliminated that it stays in the upper portion of the caldron main body 12 as it is, increases the pressure of the upper portion thereof, and pushes out the raw material of bean juice into the discharge port 24 of the caldron main body 12 in a quantity larger than necessary, thereby making it impossible to properly control the feed of the raw material of bean juice.

The orifice plate 18 prevents the steam reaching the upper portion of the caldron main body 12 with their temperature lowered from being directly discharged through the discharge port 24 so that they can be sufficiently cooled with the water-cooling jacket 16 by being stayed in the caldron main body 12. Thus, the orifice plate 18 sufficiently liquefies and condenses the steam with its temperature lowered as well as the remaining steam as well as causes the bean juice to come into contact with the inner wall surface, which is cooled with the water-cooling jacket 16, of the caldron main body 12 at the upper portion thereof, thereby effectively cooling them. The orifice plate 18 is disposed in the vicinity of the lower end of the water-cooling jacket 16 mounted to the upper portion of the caldron main body 12, and has four orifices (openings) 18a formed around the periphery thereof in the illustrated example.

With this arrangement, even if remaining steam having a quantity of heat capable of boiling the raw material G of bean juice reach the upper portion of the caldron main body 12 and stay therein while keeping their high temperature, in addition to steam with its temperature lowered, the remaining steam and the boiled bean juice are dammed out by the orifice plate 18 together, stay below the orifice plate 18 for a predetermined time and are sufficiently cooled with the water-cooling jacket 16. As a result, almost all or preferably all the steam is liquefied and condensed even if the remaining steam exists. In contrast, the upward movement of the boiled bean juice is prevented by the orifice plate 18 and passes through the orifices 18a on the periphery of the orifice plate 18. As a result, the bean juice passed through the orifices 18a is forcibly caused to contact with the cooling inner wall surface of the caldron main body 12 at the upper portion thereof so that it is not only cooled efficiently but also unliquefied steam, even if they are contained in the bean juice, are instantly liquefied and condensed. Therefore, the steam in the caldron main body 12 is not directly discharged through the discharge port 24.

The steam generation means 20 is used to generate superheated steam which will be supplied to the steam injection pipe 14 installed in the caldron main body 12 and is not particularly limited. Thus, a conventionally known boiler and the like may be used. However, it is preferable that the steam generation means 20 includes an oxygen removing means 44 for making the superheated steam to be supplied to the steam injection pipe 14 to superheated steam which preferably contains no oxygen substantially (hereinafter, referred to as superheated oxygen-free-steam).

In the illustrated example, the provision of the oxygen removing means 44 with the steam generation means 20 permits superheated oxygen-free-steam to be supplied to the steam injection pipe 14 and to be injected into the caldron main body 12 through the plurality of injection ports 26 and 28. The raw material G of bean juice in the caldron main body 12 can be thereby boiled with the superheated oxygen-free-steam that it can be boiled with superheated oxygen-free-steam so as not to be oxidized. Therefore, the quantity of the oxygen dissolved in the liquid component of the thus obtained bean juice can the minimized. As a result, little or preferably no oxygen is dissolved in the soybean milk of the present invention, which is obtained by separating a solid matter (okara) from the thus obtained bean juice, whereby the soybean milk can be stored in a fresh state for a period of time greatly longer than a conventional soybean milk.

In the illustrated example, the oxygen removing means 44 provided with the steam generation means 20 is not particularly limited so long as it can eliminate the substantial content of oxygen from steam. That is, employed as the oxygen removing means 44 may be a means for reducing pressure so that air and oxygen is not mixed into, for example, the steam generating unit of the steam generation means 20 as well as a means for reducing in advance the pressure of the water to be supplied to the steam generating unit of the steam generation means 20 or heating the water while reducing the pressure thereof so as to remove the oxygen dissolved therein, a means for removing the oxygen dissolved in water to be supplied to the steam generating unit by adding an oxygen removing agent to the water, and any other conventionally known oxygen removing means. In addition, any conventionally known oxygen removing methods may be employed.

The caldron of the illustrated example is basically arranged as described above. Operation of the caldron of the illustrated example and the boiling process in the soybean milk manufacturing method of the present invention will be described with reference to the bean-juice-manufacturing caldron shown in FIG. 2 to FIG. 7.

First, when superheated oxygen-free-steam is supplied from the steam generation means 20 into the steam injection pipe 14, the steam injected from the injection ports 26 in an radial direction is deflected by the lower deflector 30 counterclockwise in a circumferential direction in the caldron main body 12 in the lower portion of the steam injection pipe 14 so that the steam flow round backward of the injection ports 26. In contrast, the steam injected from the injection ports 28 in an radial direction is deflected by the upper deflector 32 clockwise in a circumferential direction in the caldron main body 12 in the upper portion of the steam injection pipe 14 so that the steam flow round backward of the injection ports 28.

At the time, when a raw material of bean juice is supplied by a feed pump (not shown) or the like through the charge port 22 located at the lower portion of the caldron main body 12, the raw material of bean juice in the vicinity of the lower portion of the steam injection pipe 14 is moved counterclockwise in a circumferential direction by the steam, which are injected from the plurality of injection ports 26 and 28 of the steam injection pipe 14 and deflected rightward in the figure by the lower deflector 30. In contrast, the raw material of bean juice in the vicinity of the upper portion of the steam injection pipe 14 is moved clockwise in a circumferential direction by the steam deflected leftward in the figure by the upper deflector 32. The raw material of bean juice, which is not in contact with the previously injected steam, is successively moved to the portion of the caldron main body 12 where new steam is injected from the injection ports 26 and 28 and comes into contact with the new steam having high thermal energy and high motion energy. In this manner, since the steam moves upward in the caldron main body 12 spirally, it stays in the caldron main body 12 for a long time while being in uniform contact with the raw material of bean juice. At the same time, in the vicinity of the intermediate portion of the steam injection pipe 14 between the upper portion and the lower portion thereof, the raw material of bean juice moves along a convection current which has opposite directions between the upper portion and the lower portion of the steam injection pipe 14.

The raw material of bean juice moving counterclockwise in the lower portion of the steam injection pipe 14 in the caldron main body 12 is moved upward by a not shown feed pump or the like and made to a complex turbulent flow with its turning direction reversed clockwise, whereby the steam is further more in good contact with raw material of bean juice. With this operation, the heat of the steam is uniformly and sufficiently transmitted to the raw material of bean juice. Thus, the steam is robbed of their heat thereby and liquefied and condensed from a gas so that the volume thereof is reduced, by which the pressure in the caldron main body 12 is lowered. As a result, the raw material of bean juice is not pushed out through the discharge port 24 by the pressure in the caldron main body 12 in a quantity larger than necessary to ensure that it is heated so as not to be cooked unevenly.

Subsequently, in the upper portion of the caldron main body 12, since the upward movement of the boiled bean juice and remaining steam (steam keeping their high temperature may be contained in low temperature steam) is prevented by the orifice plate 18, they stay temporarily at their locations so that the liquefaction and condensation of the remaining steam is promoted. In contrast, the remaining steam stayed by the orifice plate 18 is forcibly cooled with the cooling water flowing in the annular cooling chamber 38 of the water-cooling jacket 16 and liquefied and condensed from a gas to thereby reduce their volume, by which the pressure in the upper portion of the caldron main body 12 is lowered. In contrast, the bean juice passing through the orifices 18a on the periphery of the orifice plate 18 is effectively cooled because it is caused to come into forcible contact with the inner wall surface of the caldron main body 12 which is cooled with the annular cooling chamber 38 of the water-cooling jacket 16. Thus, the bean juice is not pushed out through the discharge port 24 by the pressure of the remaining steam in the caldron main body 12 in a quantity larger than necessary.

The thus obtained bean juice is bean juice whose quality is greatly higher than that of a conventional bean juice because it is not unevenly cooked by being uniformly and sufficiently boiled with the superheated oxygen-free-steam, is not oxidized, and contains little or substantially no dissolved oxygen. The separation of an okara from the bean juice of high quality results in the very fresh soybean milk of the present invention in which concentration of the soybean protein is higher than that in a conventional soybean milk and in which little or substantially no oxygen is dissolved. Since the thus obtained soybean milk substantially contains no dissolved oxygen, it can suppress the breeding of germs as mush as possible, whereby a period of time during which the freshness thereof can be maintained can be greatly extended as compared with that of the conventional soybean milk. Thus, the deterioration of the taste and deliciousness of the soybean milk can be prevented for a longer period of time as compared with that of the conventional soybean milk, whereby the soybean milk of the present invention can be stored longer than the conventional soybean milk.

The steam injection pipe 14 shown in FIG. 4 is provided with the two deflectors 30 and 32 for deflecting the flowing directions of the steam, which is injected from the respective injection ports 26 and 28 located at the lower portion and the upper portion of the steam injection pipe 14, in an opposite direction circumferentially, respectively. However, the present invention is not limited thereto and the steam injected from the steam injection pipe may flow in any direction and any means for regulating the flowing direction of the steam may be employed.

Figure 8:
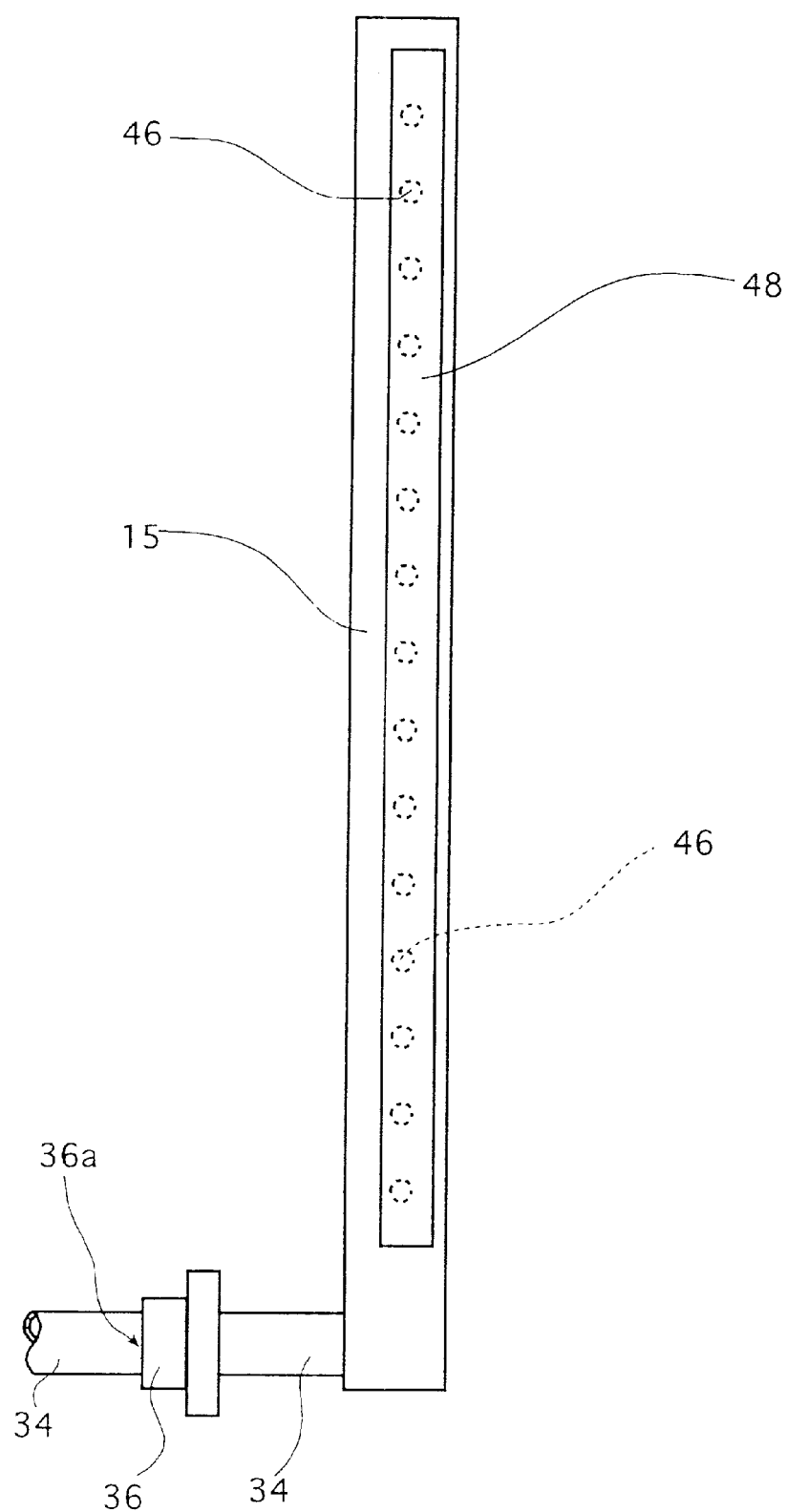
FIG. 8 is a front elevational view of another embodiment of the steam injection pipe used in the caldron shown in FIG. 2.

For example, the flowing direction of the steam injected from the plurality of steam injection ports may be deflected in the same direction circumferentially by one deflector or may be deflected in an opposite direction circumferentially using three or more deflectors, respectively. The positions where the plurality of steam injection ports are formed in correspondence to one deflector or to each of two or more deflectors are not limited to the positions on the same straight line with respect to each of the deflectors. That is, the steam injection ports may be formed on the same straight line with respect to all of the deflectors, may be formed by dislocating their positions by a predetermined angle, for example, 90° or 180° in the circumferential direction of the steam injection pipe with respect to each of the deflectors or to each injection port. Further, the steam injection ports may be disposed at equal intervals or absolutely at random. It is needless to say that each of deflectors may be provided with each of the injection ports regardless of that steam injected therefrom flows in same direction or not, or one deflector may be provided with a plurality of injection ports from which steam is injected in the same direction. A deflector used here is not limited to the flat deflector of the illustrated example and a deflector which is partly or entirely curved in the circumferential direction of the caldron main body 12 may be used. A direction in which steam is flown by the deflector is not limited to a circumferential direction precisely and it may be inclined upward or downward. While it is preferable to provide deflectors with all the injection ports, some of the injection ports may not be provided with a deflector. The direction of the holes of the injection ports formed to the steam injection pipe is not limited to the radial direction and may be inclined. Further, the number and size of the injection port formed to one steam injection pipe is not particularly limited and may be suitably selected in accordance with the characteristics of the caldron. FIG. 8 shows the steam injection pipe 15 with one deflector which is used in the caldron 10 shown in FIG. 2. The steam injection pipe 15 has a plurality injection ports 46 formed on the same straight line extending in an vertical direction. The deflector 48 is mounted obliquely on the steam injection pipe 15 near to the injection ports 46 on the left side thereof in the figure, that is, the steam injection pipe 15 is mounted so as to cover the injection ports 46 in a tangential line in the illustrated example.

In the embodiment shown in FIG. 8, the deflector 48 deflects the steam injected from the injection ports 46 so that they flow in a direction which is inclined rightwards in the figure from a radial direction, for example, rightwards in a tangential direction. As a result, the steam injected from the injection ports 46 are deflected by the deflector 48 in the direction which is inclined rightwards in the figure from the radial direction and flow counterclockwise in a circumferential direction in the caldron main body 12.

When the raw material of bean juice is supplied by the feed pump or the like through the charge port 22 located at the lower portion of the caldron main body 12, at the time the steam injection pipe 15 shown in FIG. 8 is installed in place of the steam injection pipe 14 shown in FIG. 4, the steam, which is injected and deflected by the deflector 48, move the raw material of bean juice, which is located in the vicinity of the steam injection pipe 15 in the upper and lower portions thereof, counterclockwise in the circumferential direction and move upward spirally in the caldron main body 12 together with the raw material of bean juice. As a result, the steam comes into even contact with the raw material of bean juice, stay in the caldron main body 12 for a longer time, and the heat of them is uniformly and sufficiently transmitted to the raw material of bean juice. Thus, the steam loses their energy and are liquefied from a gas and condensed, thereby reducing their volume and lowering the pressure in the caldron main body 12 as described above. As a result, since it is suppressed that the raw material of bean juice is pushed out through the discharge port 24 by the pressure in the caldron main body 12 in a quantity larger than necessary, it is heated so as not to be unevenly boiled.

In the steam injection pipe 15 arranged as described above, the mixing of the steam with the raw material of bean juice and the fluidization and stir of the raw material of bean juice by the steam are gently performed as compared those strongly performed by the turbulent flow of the steam in the steam injection pipe 14 shown in FIG. 4. Thus, the bean-juice-manufacturing caldron 10 provided with the steam injection pipe 14 shown in FIG. 4 is preferably used in main boiling, whereas the bean-juice-manufacturing caldron 10 provided with the steam injection pipe 15 shown in FIG. 8 is preferably used in additional boiling. However, the present invention is not limited thereto and the steam injection pipe 14 may be used in the additional boiling and the steam injection pipe 15 may be used in the main boiling.

In the bean-juice-manufacturing caldron 10 of the illustrated example, the deflectors 30, 32 and 46, which are obliquely mounted in the vicinity of the injection ports 26, 28 and 46 of the steam injection pipe 14 and 15, are used as a means for inclining the directions in which the steam from the injection ports is injected. However, the present invention is not limited thereto and any means may be used so long as it can make the injecting direction of the steam to the circumferential direction in the caldron main body 12. For example, the injection ports may be covered with caps to make the injecting direction of the steam to the circumferential direction in the caldron main body 12, nozzles may be attached to the injection ports, or a thick member is used for the steam injection pipe and an injection pipe may be obliquely drilled to form ports.

As described above, while the steam from the injection ports 26, 28 and 46 of the steam injection pipes 14 and 15 are injected in the circumferential direction in the caldron main body 12, the injecting direction is not restrictive. That is, the injecting direction may be any one of a clockwise direction and a counterclockwise direction, may be deflected from a clockwise direction to a counterclockwise direction and vice versa for each of the injection ports or at intervals of a few injection ports, or may be set absolutely at random.

In the bean-juice-manufacturing caldron 10 of the illustrated example, the single steam injection pipe 14 or 15 is used as the steam injection pipe. However, the present invention is not limited thereto and two or more steam injection pipes may be used. In addition, while it is preferable that the steam injection pipe used in the present invention be formed to the cylindrical shape of the illustrated example, it is not limited thereto and an elliptic cross sectional pipe, a square cross sectional pipe, a modified cross sectional pipe and the like my be used. Further, the size of the steam injection pipe is not particularly limited.

In the bean-juice-manufacturing caldron 10 of the illustrated example, while the water-cooling jacket 16 disposed at the upper portion of the caldron main body 12 is used as the cooling means, the present invention is not limited thereto and a cooling means itself may not be provided or even if a cooling means is provided, a conventionally known cooling means may be used. For example, a pipe or pipes may be spirally wound around the upper portion of the caldron main body 12 and cool water such as well water or the like may be supplied thereto by a pump. Further, a cooling medium to be used in the cooling means is not limited to cool water and any conventionally known refrigerant may be used.

In the bean-juice-manufacturing caldron 10 of the illustrated example, while the single orifice plate 18 having the orifices 18a formed around the periphery thereof is mounted as an orifice plate for temporality staying steam and bean juice, the present invention is not limited thereto. That is, an orifice plate may not be used at all or two or more orifice plates may be used. Further, the positions where the respective orifices of the orifice plates are formed, the number, size and shape of the orifices are not particularly limited and they may be suitably determined in accordance with the capability, characteristics and like of the caldron.

In the bean-juice-manufacturing caldron 10 of the illustrated example, while the steam generation means 20 including the oxygen removing means 44 is used as the steam generation means 20, the present invention is not limited thereto. That is, when bean juice, from which soybean milk which need not be stored for a long period of time is manufactured, is produced, the oxygen removing means 44 need not be necessarily provided and a conventionally known boiler and the like which are not provided with the oxygen removing means 44 may be used as the steam generation means 20. It is needless to say that when soybean milk of the present invention which can be stored for a long period of time in a fresh state is manufactured, the steam generation means 20 must be provided with the oxygen removing means 44.

In the bean-juice-manufacturing caldron 10 of the illustrated example, while the four or more similar bean-juice-manufacturing caldrons 10 are ordinarily used by being connected to each other in series, the caldron of the present invention may be used in combination with other differently-constructed caldron.

We requested the measurement of the content of the oxygen dissolved in the soybean milk, which was obtained by using the caldron described above and filtering boiled bean juice resulting from bean juice boiled with superheated steam (120° C., 5 kg) made from water from which oxygen was removed by pressure reduction to Japan Environment and Sanitary Center (address: 5-11, 3-chome, Shirakibaru, Ohnojou-shi, Fukuoka Prefecture) Japan Environment and Sanitary Center is an inspection organization authorized by the minister of Ministry of Health and Welfare (Ministry of Health and Welfare Ei: No. 923). As a result of the measurement, an average amount of oxygen dissolved in the soybean milk was 1.4 ppm. When the soybean milk was filled into a polyethylene bag in an ordinary environment, the quality thereof was not changed even if three weeks passed. A soybean curd manufactured from the soybean milk was heated, it was smooth and no porosity was made therein.

Next, a solution heating apparatus for soybean curd manufacturing used in the soybean milk coagulating process of the soybean curd manufacturing method of the fifth aspect of the present invention will be described below.

Figure 9:
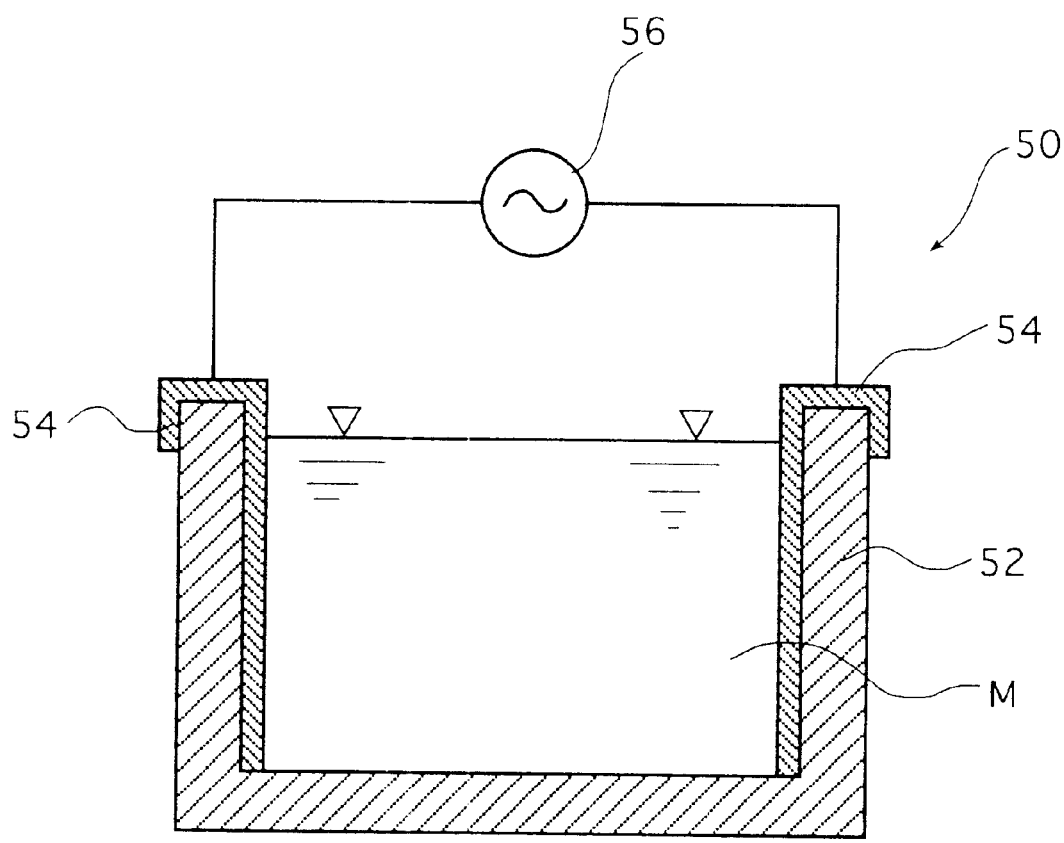
FIG. 9 is a sectional view of an embodiment of a solution heating apparatus for soybean curd manufacturing used in soybean milk coagulating process in the soybean curd manufacturing method according to the present invention.

FIG. 9 is a sectional view showing an embodiment of the solution heating apparatus for soybean curd manufacturing applied to the soybean milk coagulating process of the present invention. However, the present invention is not limited thereto.

The solution heating apparatus for soybean curd manufacturing 50 shown in the figure is used in the soybean milk coagulating process for manufacturing a soybean curd. The solution heating apparatus for soybean curd manufacturing 50 comprises a soybean curd manufacturing insulating container 52 used for a mixed solution M of soybean milk and a coagulant, two non-corrosive electrodes 54 for passing a current in the mixed solution M of the soybean milk and the coagulant in the soybean curd manufacturing insulating container 52 and a power supply 56 for passing an alternating current on the two non-corrosive electrodes 54.

The soybean curd manufacturing insulating container 52 is an insulating container made of synthetic resin for manufacturing a soybean curd by mixing soybean milk charged thereinto with a coagulant such as nigari or the like and coagulating a mixed solution M of the soybean milk and the coagulant. A material of the container 52 may be any material so long as it has a durability against a temperature of 75–90° C. as well as an insulating property, and a synthetic resin having an insulating property, for example, Duracon and the like can be exemplified as the material. Further, while the container 52 of the illustrated example has a rectangular cross sectional shape, the present invention is not limited thereto and it may have any cross sectional shape.

The non-corrosive electrodes 54 are plate-shaped electrodes disposed along both the inner walls of the soybean curd manufacturing insulating container 52. They are immersed in the mixed solution M of the soybean milk and the coagulant in the soybean curd manufacturing insulating container 52 and supply a current thereto so that they generate heat by themselves. When electrode plates are corroded by electricity at the time the electrodes 54 are energized, a manufactured soybean curd has a stain, for example, a black spot resulting from the corroded electrode plates. To cope with this problem, the plate-shaped electrodes 54 must be made of a material which is not corroded even if it is immersed in the mixed solution M of the soybean milk and the coagulant and energized therein. However, electrodes made of any material may be used so long as the material satisfies this condition. Steel containing titanium, titanium and the like, for example, are exemplified as the material of electrode to be used.

The power supply 56 is an alternating current power supply for passing an alternating current on the two non-corrosive electrodes 54. If a soybean milk is electrolyzed by the current imposed on the non-corrosive electrodes 54, a soybean curd cannot be manufactured because soybean protein is not condensed and thus cannot be coagulated. To cope with this problem, the current must be passed under the condition in which no electrolysis generates. Note that this condition can be also set by restricting a quantity of current per unit area of soybean milk with which the non-corrosive electrodes 54 have contact. As an example, it is preferable to set the quantity of current to 50 mA/cm2 or less. When the upper limit of the current is set, it is preferable to use a constant-current device to an alternating current supply power unit to maintain the current below the upper limit current so as to prevent an excessive current resulting from the change of an electric resistance due to heating.

In the soybean curd manufacturing method of the fifth aspect of the present invention, the solution heating apparatus for soybean curd manufacturing 50 is used in the soybean milk coagulating process. Accordingly, a tasteful, sweet-smelling and delicious soybean curd of high quality, in which no porosity is formed and which has a sufficient water keeping property, can be manufactured in a short time without the need of any sophisticated expert techniques, that is, even in ordinary homes and eating houses, which do not have any skilled soybean curd manufacturing techniques, using the soybean milk of high quality as a raw material such as the soybean milk of the first aspect of the present invention and the soybean milk filled into the soybean milk packs of the second aspect of the present invention.

Since the solution heating apparatus for soybean curd manufacturing 50 used here can uniformly increase temperature without any oscillation, it can manufacture an elastic soybean curd without any porosity by tightening the binding of soybean protein particles in soybean milk.

A coagulant used in the present invention is not particularly limited, and, for example, calcium chloride, a nigari mainly composed of calcium chloride, calcium sulfate and the like can be exemplified. However, calcium chloride and nigari mainly composed of calcium chloride are preferably used because they can extract the deliciousness and sweet taste of soybeans and add them to a soybean curd.

The solution heating apparatus for soybean curd manufacturing used in the soybean milk coagulating process of the soybean curd manufacturing method of the fifth aspect of the present invention is basically arranged as described above.

While the soybean milk, the soybean milk packs, the manufacturing methods thereof and the soybean curd manufacturing method using the soybean milk and soybean milk packs have been described above in detail with reference to the various embodiments, the present invention is by no means limited to the above embodiments and it goes without saying that various improvements and design modifications can be made within the range which does not depart from the gist of the invention.

INDUSTRIAL APPLICABILITY

As described above in detail, according to the first aspect of the present invention, there can be achieved an effect that soybean milk of high quality can be provided. The soybean milk can be obtained by separating a solid matter from evenly boiled bean juice of high quality, which is obtained using the novel caldron. The soybean milk is not sterilized at high temperature, substantially contains no oxygen dissolved therein or mixed therewith, can be stored while keeping the sweet taste, smell, deliciousness and freshness characteristic to soybean milk without breeding germs, and undergo less deterioration even if it is stored. Further, the soybean milk can be not only used as a raw material of soybean curd of high quality but also drunk as it is as a drink.

According to the second aspect of the present invention, there can be achieved an effect for providing soybean milk packs into which the soybean milk of high quality is filled and which can be stored for a long time, and which can be handled easily and supplied to ordinary homes and eating houses as well as to speciality soybean curd manufacturers.

According to the third and fourth aspects of the present invention, there can be achieved an effect that the soybean milk of high quality and the soybean milk packs into which the soybean milk of high quality is filled can be stably and reliably manufactured.

According to the fifth aspect of the present invention, there can be achieved an effect a just cooked and fresh soybean curd of high quality can be supplied to dining tables. The soybean curd can be manufactured easily in a short time by a nonprofessional even in ordinary homes and eating houses, in addition to speciality soybean curd manufacturers, using the soybean milk and soybean milk packs of high quality. The thus made soybean curd is fresh, tasteful, delicious and mild on the tongue and has a good water keeping property without porosities formed therein.

What is claimed is:

1. A soybean milk manufacturing method comprising the steps of:

immersing soybeans in water for a predetermined time to obtain swelled soybeans;

grinding the thus obtained swelled soybeans to obtain ground soybeans;

boiling the thus obtained ground soybeans with superheated steam evaporating from water processed by an oxygen removing treatment and containing little or no oxygen for a predetermined time to obtain a boiled bean juice containing soybean protein which is extracted from the boiled soybeans, the boiled bean juice including a solid matter of the boiled soybeans; and manufacturing soybean milk in which the soybean protein is suspended and which contains oxygen dissolved therein in an amount of 5 ppm or less by separating the solid matter from the thus obtained boiled bean juice without cooling it in an oxygen-free environment.

2. The soybean milk manufacturing method according to claim 1, characterized in that the oxygen in the superheated steam and the oxygen dissolved in the soybean milk are substantially zero.

3. A soybean milk pack manufacturing method comprising the steps of:

immersing soybeans in water for a predetermined time to obtain swelled soybeans;

grinding the thus obtained swelled soybeans to obtain ground soybeans;

boiling the thus obtained ground soybeans with superheated steam evaporating from water processed by an oxygen removing treatment and containing little or no oxygen for a predetermined time to obtain boiled bean juice containing soybean protein which is extracted from the boiled soybeans, the boiled bean juice including a solid matter of the boiled soybeans;

manufacturing soybean milk in which the soybean protein is suspended and which contains oxygen dissolved therein in amount of 5 ppm or less by separating the solid matter from the thus obtained boiled bean juice without cooling it in an oxygen-free environment; and filling the thus manufactured soybean milk into a pack container without heating it and without cooling it.

4. The soybean milk pack manufacturing method according to claim 3, characterized in that after the filling step is performed, the soybean milk pack is cooled and stored at a temperature of 1° C.–10° C. or less.

5. The soybean milk pack manufacturing method according to claim 3, characterized in that oxygen in the superheated steam, the oxygen dissolved in the soybean milk and oxygen mixed when the soybean milk is filled into the pack container are substantially zero.

6. A soybean curd manufacturing method comprising the steps of:

immersing soybeans in water for a predetermined time to obtain swelled soybeans;

grinding the thus obtained swelled soybeans to obtain ground soybeans;

boiling the thus obtained ground soybeans with superheated steam evaporating from water processed by an oxygen removing treatment and containing little or no oxygen for a predetermined time to obtain boiled bean juice containing soybean protein which is extracted from the boiled soybeans, the boiled bean juice including a solid matter of the boiled soybeans; p1 manufacturing soybean milk in which the soybean protein is suspended and which contains oxygen dissolved therein in an amount of 5 ppm or less by separating the solid matter from the thus obtained boiled bean juice without cooling it in an oxygen-free environment;

filling the soybean milk into a soybean curd manufacturing insulated container or tearing open a soybean milk pack manufactured by filling the soybean milk into a pack container without heating it and without cooling it and filling the soybean milk contained therein into the soybean curd manufacturing insulated container;

adding a suitable amount of a coagulant to the soybean milk in the soybean curd manufacturing insulated container and sufficiently mixing the coagulant with the soybean milk to obtain a mixed solution;

immersing non-corrosive electrodes in the mixed solution;

passing an alternating current between the non-corrosive electrodes under such conditions that no electrolysis occurs in the mixed solution; and manufacturing a soybean curd by coagulating the soybean protein by heating the mixed solution from passing of the alternating current.

7. The soybean curd manufacturing method according to claim 6, characterized in that the ground soybeans are boiled with the superheated steam to obtain boiled bean juice for manufacturing the soybean curd by the steps of:

using a caldron comprising a caldron main body having a chart port disposed in the vicinity of an end thereof and a discharge port disposed in the vicinity of the other end thereof with both the ends closed, at least a steam injection pipe installed in the caldron main body and having a plurality of steam injection ports disposed along the longitudinal direction of the caldron main body and a steam generation means, wherein the superheated steam is injected from the steam injection ports in at least an inclined direction from radial direction of the steam injection pipe so as to be supplied in at least a circumferential direction in the caldron main body;

charging the ground soybeans through the charge port;

supplying the superheated steam generated by the steam generation means to the steam injection pipe;

injecting the superheated steam from the plurality of steam injection ports of the steam injection pipe and supplying the superheated steam in at least a circumferential direction of the caldron main body;

mixing the ground soybeans with the superheated steam to obtain a mixture and stirring the mixture while fluidizing the ground soybeans and boiling the ground soybeans to obtain the boiled bean juice containing soybean protein; and discharging the boiled bean juice through the discharge port.

8. The soybean curd manufacturing method according to claim 7, characterized in that the superheated steam injected from the plurality of steam injection ports of the steam injection pipe are supplied in a same circumferential direction in the caldron main body, or the superheated steam injected from a portion of the plurality of steam injection ports and the superheated steam injected from the remaining portion thereof are supplied in opposite circumferential directions in the caldron main body, respectively.

9. The soybean curd manufacturing method according to claim 7, characterized in that the caldron further comprises a cooling means disposed to the caldron main body on a discharge side thereof for cooling the boiled bean juice and remaining steam of the superheated steam in the caldron main body.

10. The soybean curd manufacturing method according to claim 7, characterized in that the steam generation means includes an oxygen removing means.

11. The soybean curd manufacturing method according to claim 7, characterized in that the superheated steam contains no oxygen.

12. The soybean curd manufacturing method according to claim 7, characterized in that the coagulant is nigari.

* * * * *